(12) United States Patent
Ogawa et al.

(10) Patent No.: US 8,309,466 B2
(45) Date of Patent: *Nov. 13, 2012

(54) POLISHING PAD

(75) Inventors: Kazuyuki Ogawa, Osaka (JP); Tetsuo Shimomura, Osaka (JP); Yoshiyuki Nakai, Osaka (JP); Masahiko Nakamori, Otsu (JP); Takatoshi Yamada, Otsu (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 906 days.

This patent is subject to a terminal disclaimer.

(21) Appl. No.: 12/065,219

(22) PCT Filed: Aug. 22, 2006

(86) PCT No.: PCT/JP2006/316372
§ 371 (c)(1),
(2), (4) Date: Feb. 28, 2008

(87) PCT Pub. No.: WO2007/026569
PCT Pub. Date: Mar. 8, 2007

(65) Prior Publication Data
US 2009/0104850 A1    Apr. 23, 2009

(30) Foreign Application Priority Data
Aug. 30, 2005    (JP) .................................. 2005-249046

(51) Int. Cl.
*H01L 21/302* (2006.01)
*H01L 21/461* (2006.01)
*B32B 5/00* (2006.01)
*B32B 3/26* (2006.01)

(52) U.S. Cl. ........ 438/692; 438/693; 428/98; 428/304.4
(58) Field of Classification Search ....................... None
See application file for complete search history.

(56) References Cited

U.S. PATENT DOCUMENTS

| 3,198,757 A | 8/1965 | Considine et al. |
| 4,410,668 A | 10/1983 | Piccirilli et al. |
| 5,455,113 A | 10/1995 | Girgis et al. |

(Continued)

FOREIGN PATENT DOCUMENTS

CN    1407606    4/2003

(Continued)

OTHER PUBLICATIONS

Chinese Office Action mailed on May 8, 2009 directed at counterpart application No. 200680032101.0 ; 5 pages.

(Continued)

*Primary Examiner* — Shamim Ahmed
*Assistant Examiner* — Bradford Gates
(74) *Attorney, Agent, or Firm* — Morrison & Foerster LLP

(57) ABSTRACT

A polishing pad has an excellent polishing rate and is superior in longevity without generating center slow. A method of manufacturing a semiconductor device with the polishing pad is also provided. The polishing pad has a polishing layer consisting of a polyurethane foam having fine cells, wherein a high-molecular-weight polyol component that is a starting component of the polyurethane foam contains a hydrophobic high-molecular-weight polyol A having a number-average molecular weight of 550 to 800 and a hydrophobic high-molecular-weight polyol B having a number-average molecular weight of 950 to 1300 in an A/B ratio of from 10/90 to 50/50 by weight.

11 Claims, 1 Drawing Sheet

U.S. PATENT DOCUMENTS

| | | | |
|---|---|---|---|
| 5,587,502 | A | 12/1996 | Moren et al. |
| 5,614,575 | A | 3/1997 | Kotschwar |
| 5,670,599 | A | 9/1997 | Bassner |
| 5,840,782 | A | 11/1998 | Limerkens et al. |
| 6,439,989 | B1 | 8/2002 | Reinhardt et al. |
| 6,477,926 | B1 | 11/2002 | Swisher et al. |
| 6,706,383 | B1 | 3/2004 | Obeng et al. |
| 6,777,455 | B2 | 8/2004 | Seyanagi et al. |
| 6,837,781 | B2 | 1/2005 | Hishiki |
| 6,887,911 | B2 | 5/2005 | Shidaker et al. |
| 7,094,811 | B2 | 8/2006 | Nodelman et al. |
| 2002/0016139 | A1 | 2/2002 | Hirokawa et al. |
| 2002/0058469 | A1 | 5/2002 | Pinheiro et al. |
| 2002/0078632 | A1 | 6/2002 | Hasegawa et al. |
| 2002/0183409 | A1 | 12/2002 | Seyanagi et al. |
| 2003/0109209 | A1 | 6/2003 | Hishiki |
| 2003/0143931 | A1 | 7/2003 | Hirokawa et al. |
| 2004/0054023 | A1 | 3/2004 | Kaneda et al. |
| 2004/0157985 | A1 | 8/2004 | Masui et al. |
| 2004/0224622 | A1 | 11/2004 | Sakurai et al. |
| 2004/0242719 | A1 | 12/2004 | Seyanagi et al. |
| 2005/0064709 | A1 | 3/2005 | Shimomura et al. |
| 2005/0171224 | A1 | 8/2005 | Kulp |
| 2005/0176912 | A1* | 8/2005 | Shin et al. ........................ 528/44 |
| 2005/0222288 | A1 | 10/2005 | Seyanagi et al. |
| 2006/0037699 | A1 | 2/2006 | Nakamori et al. |
| 2006/0078742 | A1 | 4/2006 | Kauffman et al. |
| 2006/0089095 | A1 | 4/2006 | Swisher et al. |
| 2006/0122287 | A1 | 6/2006 | Yamamoto et al. |
| 2006/0280929 | A1 | 12/2006 | Shimomura et al. |
| 2006/0280930 | A1 | 12/2006 | Shimomura et al. |
| 2007/0190905 | A1 | 8/2007 | Shimomura et al. |
| 2008/0085943 | A1 | 4/2008 | Doura et al. |
| 2008/0305720 | A1 | 12/2008 | Hirose et al. |
| 2008/0313967 | A1 | 12/2008 | Sakurai et al. |
| 2009/0047872 | A1 | 2/2009 | Fukuda et al. |
| 2009/0093201 | A1* | 4/2009 | Kazuno et al. ................ 451/533 |
| 2009/0253353 | A1 | 10/2009 | Ogawa et al. |
| 2009/0298392 | A1 | 12/2009 | Okamoto et al. |
| 2010/0003896 | A1 | 1/2010 | Nakai et al. |
| 2010/0015893 | A1 | 1/2010 | Kazuno et al. |
| 2010/0048102 | A1 | 2/2010 | Nakai et al. |
| 2011/0218263 | A1 | 9/2011 | Kazuno et al. |

FOREIGN PATENT DOCUMENTS

| | | |
|---|---|---|
| CN | 1487965 | 4/2004 |
| CN | 1586002 | 2/2005 |
| CN | 1602321 | 3/2005 |
| CN | 1628138 | 6/2005 |
| CN | 101115779 | 1/2008 |
| EP | 0 656 031 | 6/1995 |
| EP | 1 647 588 | 4/2006 |
| JP | 2-91279 | 3/1990 |
| JP | 6-220151 | 8/1994 |
| JP | 8-500622 | 1/1996 |
| JP | 3013105 | 1/1996 |
| JP | 8-71378 | 3/1996 |
| JP | 11-511748 A | 10/1999 |
| JP | 2000-17252 | 1/2000 |
| JP | 3516874 | 6/2000 |
| JP | 2000-248034 | 9/2000 |
| JP | 2000-343412 | 12/2000 |
| JP | 2001-047355 A | 2/2001 |
| JP | 2001-089548 A | 4/2001 |
| JP | 2001-105300 | 4/2001 |
| JP | 2001-513450 A | 9/2001 |
| JP | 2001-277101 | 10/2001 |
| JP | 2001-518852 A | 10/2001 |
| JP | 2002-059358 | 2/2002 |
| JP | 2002-134445 A | 5/2002 |
| JP | 2002-144220 A | 5/2002 |
| JP | 2002-239905 | 8/2002 |
| JP | 2002-535843 A | 10/2002 |
| JP | 3359629 | 10/2002 |
| JP | 2003-11066 | 1/2003 |
| JP | 2003-62748 A | 3/2003 |
| JP | 2003-89051 | 3/2003 |
| JP | 2003-128910 | 5/2003 |
| JP | 2003-145414 A | 5/2003 |
| JP | 2003-171433 | 6/2003 |
| JP | 2003-218074 | 7/2003 |
| JP | 3455187 | 7/2003 |
| JP | 2003-224094 | 8/2003 |
| JP | 2004-1169 | 1/2004 |
| JP | 3490431 | 1/2004 |
| JP | 2004-75700 | 3/2004 |
| JP | 2004-167680 | 6/2004 |
| JP | 2004-188716 | 7/2004 |
| JP | 2004-193390 | 7/2004 |
| JP | 2004-211076 A | 7/2004 |
| JP | 3571334 B2 | 7/2004 |
| JP | 2004-235446 | 8/2004 |
| JP | 2004-330411 | 11/2004 |
| JP | 2005-52907 A | 3/2005 |
| JP | 2005-68174 | 3/2005 |
| JP | 2005-68175 | 3/2005 |
| JP | 2005-120275 | 5/2005 |
| JP | 2005-517060 | 6/2005 |
| JP | 2006-111880 | 4/2006 |
| JP | 2006-190826 | 7/2006 |
| JP | 2006-231429 | 9/2006 |
| WO | WO-94/04599 | 3/1994 |
| WO | WO-96/38453 A1 | 12/1996 |
| WO | WO-98/45087 A1 | 10/1998 |
| WO | WO-99/07515 A1 | 2/1999 |
| WO | WO-00/43159 A1 | 7/2000 |
| WO | WO-01/96434 | 12/2001 |
| WO | WO-02/24415 A1 | 3/2002 |
| WO | WO-02/083757 | 10/2002 |
| WO | WO-03/043071 A1 | 5/2003 |
| WO | WO-03/066703 | 8/2003 |
| WO | WO-2004/049417 | 6/2004 |
| WO | WO-2004/055089 A1 | 7/2004 |
| WO | WO-2006/095591 | 9/2006 |

OTHER PUBLICATIONS

International Preliminary Report on Patentability, mailed Mar. 4, 2008, directed to counterpart International Patent Application No. PCT/JP2006/316372. 6 pages.

International Search Report dated Nov. 21, 2006, directed to counterpart PCT application No. PCT/JP2006/316372; 4 pages.

International Search Report mailed Aug. 8, 2006 directed to application No. PCT/JP2006/309380 (11 pages).

Chinese Office Action issued on Nov. 21, 2008 directed towards foreign application No. 200680017384.1; 9 pages.

Chinese Office Action mailed on Jul. 10, 2009 directed at counterpart application. 200680017384.1; 6 pages.

Chinese Office Action mailed on Mar. 23, 2010, directed to corresponding Chinese Patent Application No. 200910135488.8; 13 pages.

Chinese Office Action mailed Apr. 22, 2010, directed to corresponding Chinese Patent Application No. 200910135487.3; 17 pages.

Kazuno et al., U.S. Office Action mailed Dec. 6, 2010 directed to U.S. Appl. No. 11/914,547; 15 pages.

Chinese Second Office Action mailed Nov. 23, 2010, directed to Chinese Patent Application No. 200910135488.8; 14 pages.

Japanese Notification of Reasons for Refusal mailed Mar. 15, 2011 directed to Japanese Application No. 2005-144304; 6 pages.

Japanese Notification of Reasons for Refusal mailed Mar. 15, 2011 directed to Japanese Application No. 2005-144292; 6 pages.

Japanese Notification of Reasons for Refusal mailed Mar. 15, 2011 directed to Japanese Application No. 2005-144318; 6 pages.

Chinese Second Office Action mailed Apr. 13, 2011, directed to Chinese Patent Application No. 200910135487.3; 16 pages.

Japanese Notification of Reasons for Refusal mailed May 27, 2011, directed to Japanese Application No. 2006-005787; 6 pages.

Doura et al., U.S. Office Action mailed Jul. 8, 2011, directed to U.S. Appl. No. 11/794,284; 6 pages.

Kazuno et al., U.S. Office Action mailed Jun. 23, 2011, directed to U.S. Appl. No. 11/914,547; 12 pages.

Fukuda et al., U.S. Office Action mailed Jun. 8, 2011, directed to U.S. Appl. No. 12/095,859; 7 pages.

Decision of Refusal mailed Jun. 24, 2011, directed to Japanese Application No. 2005-144304; 4 pages.
Decision of Refusal mailed Jun. 28, 2011, directed to Japanese Application No. 2005-144292; 4 pages.
Decision of Refusal mailed Jun. 28, 2011, directed to Japanese Application No. 2005-144318; 4 pages.
Kazuno et al., Office Action mailed Jun. 5, 2012, directed to U.S. Appl. No. 13/107,347; 8 pages.
Nakai et al., Office Action mailed Jun. 7, 2012, directed to U.S. Appl. No. 12/439,154; 17 pages.
Notification of Reexamination issued Apr. 19, 2012, directed to Chinese Application No. 200780027350.5; 15 pages.
Doura et al., U.S. Office Action mailed Jul. 22, 2010, directed to U.S. Appl. No. 11/794,284; 7 pages.
Doura et al., U.S. Office Action mailed Jan. 6, 2011, directed to U.S. Appl. No. 11/794,284; 5 pages.
Kazuno et al., U.S. Office Action mailed Nov. 28, 2011, directed to U.S. Appl. No. 11/914,547; 8 pages.
Kazuno et al., U.S. Office Action mailed Nov. 10, 2011, directed to U.S. Appl. No. 13/107,347; 7 pages.
Nakai, Y. et al., U.S. Office Action mailed Nov. 10, 2011, directed to U.S. Appl. No. 12/439,154; 17 pages.
Nakai, Y. et al., U.S. Office Action mailed Nov. 25, 2011, directed to U.S. Appl. No. 12/593,206; 8 pages.
Kazuno et al., U.S. Office Action mailed Feb. 28, 2012, directed to U.S. Appl. No. 12/439,135; 6 pages.
Chinese Decision of Rejection mailed Nov. 12, 2010, directed to Chinese Patent Application No. 200780027350.5; 26 pages.
Chinese Office Action mailed Aug. 4, 2010, directed to Chinese Patent Application No. 200880008905.6; 7 pages.
Chinese Notification of the Second Office Action issued on Jun. 17, 2011, directed to Chinese Patent Application No. 200880008905.6; 10 pages.
Chinese Rejection Decision mailed Jul. 29, 2011, directed to Chinese Application No. 200910135487.3; 14 pages.
Chinese Office Action issued Jan. 8, 2010, directed to Chinese Application No. 200680004397.5; 25 pages.
Chinese Second Office Action issued May 5, 2011, directed to Chinese Application No. 200680004397.5; 21 pages.
Chinese Third Office Action mailed Aug. 29, 2011, directed to Chinese Patent Application No. 200680004397.5; 16 pages.
Chinese Office Action mailed Apr. 1, 2010, directed to Chinese Patent Application No. 200780027348.8; 9 pages.
Chinese Office Action mailed Mar. 11, 2010, directed to Chinese Patent Application No. 200780027350.5; 17 pages.
Notice of Hearing mailed Nov. 29, 2011, directed towards Japanese Application No. 2005-144304; 6 pages.
Japanese Notification of Reasons for Refusal mailed Aug. 17, 2011, directed to Japanese Application No. 2006-006210; 5 pages.
Japanese Notification of Reasons for Refusal mailed Aug. 9, 2011, directed to U.S. Application No. 2005-249046; 6 pages.
Japanese Notification of Reasons for Refusal mailed Nov. 25, 2010, directed to Japanese Application No. 2006-002346; 4 pages.
Japanese Notification of Reasons for Refusal mailed Jul. 12, 2011, directed to Japanese Application No. 2006-002346; 6 pages.
Japanese Notification of Reasons for Refusal mailed Dec. 22, 2011, directed to Japanese Application No. 2006-005787; 4 pages.
Japanese Notification of Reasons for Refusal mailed Nov. 25, 2010, directed to Japanese Application No. 2006-005803; 4 pages.
Japanese Notification of Reasons for Refusal mailed Oct. 4, 2011, directed to Japanese Patent Application No. 2006-235978; 13 pages.
Japanese Notification of Reasons for Refusal mailed Feb. 1, 2012, directed to Japanese Application No. 2007-084785; 8 pages.
Japanese Notification of Reasons for Refusal mailed Feb. 14, 2012, directed to Japanese Application No. 2006-002346; 4 pages.
International Preliminary Report on Patentability and Written Opinion mailed Jul. 24, 2008, directed to Application No. PCT/JP2007/050072; 11 pages.
International Search Report mailed Mar. 6, 2007, directed to Application No. PCT/JP2007/050072; 3 pages.
International Search Report mailed Jun. 24, 2008, directed to International Patent Application No. PCT/JP2008/054583; 2 pages.
International Search Report mailed May 30, 2006, directed to Application No. PCT/JP2006/303605; 4 pages.
International Search Report mailed Nov. 27, 2007, directed to International Patent Application No. PCT/JP2007/065934; 1 page.
International Search Report mailed Nov. 27, 2007, directed to International Patent Application No. PCT/JP2007/066288; 4 pages.
Korean Office Action mailed Jul. 7, 2011, directed to Korean Application No. 10-2009-7013449; 5 pages.
Korean Office Action mailed Jul. 7, 2011, directed to Korean Application No. 10-2009-7013450; 6 pages.
Taiwanese Office Action mailed Nov. 17, 2010, directed to Taiwanese Application No. 096100913; 7 pages.
Taiwanese Office Action mailed May 18, 2011, directed to Taiwanese Patent Application No. 096130712; 10 pages.
Taiwanese Office Action mailed Nov. 24, 2011, directed to Taiwanese Application No. 097109615; 10 pages.
Matsunaga, Katsuharu. (2005). "Hard Foam" Section 7.4.3. In *The Comprehensive Materials and Technology for a Novel Polyurethan Production*. First Print, Kabushiki Kaisha CMC Shuppan, pp. 107-108.
Notification of First Office Action issued Feb. 28, 2012, directed to Chinese Application No. 201110049840.3; 11 pages.
Notification of the Third Office Action issued Feb. 29, 2012, directed to Chinese Application No. 200880008905.6; 12 pages.
Nakai et al., Office Action mailed Jul. 5, 2012, directed to U.S. Appl. No. 12/593,206; 9 pages.

* cited by examiner

POLISHING PAD

REFERENCE TO RELATED APPLICATIONS

This application is a national stage application under 35 USC 371 of International Application No. PCT/JP2006/316372, filed Aug. 22, 2006, which claims the priority of Japanese Patent Application No. 2005-249046, filed Aug. 30, 2005, the contents of both of which prior applications are incorporated herein by reference.

FIELD OF THE INVENTION

The invention relates to a polishing pad capable of performing planarization of materials requiring a high surface planarity such as optical materials including a lens and a reflecting mirror, a silicon wafer, a glass substrate or an aluminum substrates for a hard disc and a product of general metal polishing with stability and a high polishing efficiency. A polishing pad of the invention is preferably employed, especially, in a planarization step of a silicon wafer or a device on which an oxide layer or a metal layer has been formed prior to further stacking an oxide layer or a metal layer thereon.

BACKGROUND OF THE INVENTION

Typical materials requiring surface flatness at high level include a single-crystal silicon disk called a silicon wafer for producing semiconductor integrated circuits (IC, LSI). The surface of the silicon wafer should be flattened highly accurately in a process of producing IC. LSI etc., in order to provide reliable semiconductor connections for various coatings used in manufacturing the circuits. In the step of polishing finish, a polishing pad is generally stuck on a rotatable supporting disk called a platen, while a workpiece such as a semiconductor wafer is stuck on a polishing head. By movement of the two, a relative speed is generated between the platen and the polishing head while polishing slurry having abrasive grains is continuously supplied to the polishing pad, to effect polishing processing.

As polishing characteristics of a polishing pad, it is requested that a polished object is excellent in planarity and uniformity and a polishing rate is high. The planarity and uniformity of a polished object can be improved to some extent by using a polishing layer having higher elastic modulus. The polishing rate can be improved by increasing the amount of slurry retained on foam having cells therein.

The method of increasing the amount of slurry to be retained includes a method which involves rendering a polishing pad itself hydrophilic, and specific examples include (1) a method which involves introducing hydrophilic groups such as hydroxyl groups into a matrix material and (2) a method which involves mixing a matrix material with a hydrophilic substance. For example, a polishing pad composition comprising (A) a crosslinked elastomer and (B) a substance having functional groups such as hydroxyl groups is disclosed (Patent Literature 1). Further, a polishing tool comprising a hydrophilic substance added to, or (modifying) hydrophilic groups added to, a material constituting the polishing tool is disclosed (Patent Literature 2). In addition, a polishing pad comprising a thermosetting polymer matrix resin containing a hydrophilic and substantially water-insoluble sheet-shaped substance is disclosed (Patent Literature 3). Furthermore, a polishing pad comprising a hydrophilizing agent-containing polyurethane composition containing urethane resin obtained by copolymerizing compounds having hydrophilic groups is disclosed (Patent Literature 4).

In the method (1), however, there is a possibility that when the matrix material is polyurethane, active hydrogen-containing hydrophilic groups such as hydroxyl groups react with isocyanate groups in synthesis of polyurethane, and as a result, an unreacted polyol component remains in the material. This remaining polyol component gives rise to a plasticizing effect so that the physical properties of the polishing pad tend to be deteriorated. In the method (2), the hydrophilic substance is hardly uniformly mixed in the matrix material, so a polishing pad having uniform physical properties cannot be obtained.

When the polishing rate varies from the start of use to the end of use, the polishing conditions should be regulated, and there is also the problem of poor efficiency of polishing.

For example, for the purpose of providing a non-foam urethane polishing material capable of efficiently polishing a semiconductor wafer with excellent planarity, there is disclosed a polishing material comprising a polishing material composition consisting of an isocyanate-terminated urethane prepolymer and an active hydrogen-containing compound, wherein the isocyanate-terminated urethane prepolymer is obtained using an aromatic diisocyanate as polyisocyanate and a polyol component consisting of low-molecular-weight polyol and high-molecular-weight polyol, the low-molecular-weight polyol including diethylene glycol, 1,3-butylene glycol etc. (Patent Literature 5).

For the purpose of endowing a polishing cloth itself with dressing properties to prolong the polishing duration of the polishing cloth, there is disclosed a polishing cloth comprising a polyurethane composition wherein the abrasion wear of the cloth is 150 to 350 mg in a Taber abrasion test (Patent Literature 6).

However, the polishing material disclosed in Patent Literature 5 consists of non-foam urethane, and the non-foam polishing material is provided with grooves because of low polishing rate, but abrasive grains and polishing waste etc. in slurry are topically present etc. to make the stabilization of the polishing rate very difficult. The polishing cloth disclosed in Patent Literature 6 is easily worn, is poor in hardness (due to uneven cells and large cell diameters), and is thus poor in planarity and uniformity, and the polishing rate is inevitably changed significantly.

Further, the conventional polishing pad has a problem of center slow (phenomenon where the center of a wafer is hardly polished).

Patent Literature 1: JP-A 2002-134445
Patent Literature 2: JP-A 2003-11066
Patent Literature 3: JP-A 2002-59358
Patent Literature 4: JP-A 2003-128910
Patent Literature 5: JP-A 2000-17252
Patent Literature 6: JP-A 2001-277101

SUMMARY OF THE INVENTION

An object of the present invention is to provide a polishing pad excellent in polishing rate and superior in longevity without generating center slow. Another object of the present invention is to provide a method of manufacturing a semiconductor device with the polishing pad.

The present inventors made extensive study for solving the problem, and as a result, found that the objects can be achieved by the following polishing pad, and the present invention was thereby completed.

That is, the polishing pad of the present invention is a polishing pad having a polishing layer consisting of a polyurethane foam having fine cells, wherein a high-molecular-weight polyol component that is a starting component of the polyurethane foam contains a hydrophobic high-molecular-weight polyol A having a number-average molecular weight of 550 to 800 and a hydrophobic high-molecular-weight polyol B having a number-average molecular weight of 950 to 1300 in an A/B ratio of from 10/90 to 50/50 by weight.

The polishing pad described above is excellent in polishing rate and superior in longevity. In particular, the polishing pad is characterized by solving the problem of center slow. The reason for generation of center slow where the conventional polishing pad is used, is estimated as follows: Usually, the surface of the polishing pad is provided with grooves or fine openings for retaining and renewing the slurry and for removing generated polishing waste. When the polishing procedure is carried out, the grooves and fine openings are clogged with abrasive grains and polishing waste, and thus the surface of the polishing pad should be renewed by grinding with dressing. However, the surface of the conventional polishing pad is made hardly ground, thus making complete prevention of clogging difficult to deteriorate its ability to retain polishing slurry on the surface of the pad, which would result in generation of center slow. The reason for difficult dressing of the conventional polishing pad is 1) the specific gravity of the polishing layer is high, and 2) the material of the polishing layer itself has "consistency". It is considered that particularly when the material of the polishing layer itself has "consistency", dressing waste upon dressing is increased, and the grooves and fine openings are clogged with the dressing waste, thus undergoing clogging. It is conceivable that the specific gravity may be reduced in order to attain easy dressing of the surface of the polishing layer, but simple reduction of the specific gravity is not preferable because the hardness of the polishing pad as a whole is reduced to deteriorate planarizing quality. It is also conceivable that the molecular weight of the high-molecular-weight polyol is decreased for reducing the specific gravity and simultaneously maintaining the hardness, but in this case, the abrasion wear of the surface of the polishing layer becomes higher than necessary, to reduce the longevity of the polishing pad, and the fluffiness of the surface of the polishing layer after dressing is eliminated immediately at the time of wafer polishing, to reduce the polishing rate.

The present inventors found that as the high-molecular-weight polyol component that is a starting component of the polyurethane foam, the hydrophobic high-molecular-weight polyol A having a number-average molecular weight of 550 to 800 (also referred to hereinafter as "polyol A") and the hydrophobic high-molecular-weight polyol B having a number-average molecular weight of 950 to 1300 (also referred to hereinafter as "polyol B") are used in an A/B ratio of from 10/90 to 50/50 by weight, thereby reducing the specific gravity of the polishing layer while maintaining high hardness, and further reducing the "consistency" of the material itself suitably.

The polyols A and B have molecular-weight peak values respectively, and a mixture of both the polyol components has at least two peak values.

When the number-average molecular weight of the polyol A is less than 550 and/or the number-average molecular weight of the polyol B is less than 950, the abrasion wear of the surface of the polishing layer becomes higher than necessary, thus reducing the longevity of the polishing pad, and the fluffiness of the surface of the polishing layer after dressing is eliminated immediately upon wafer polishing, to reduce the polishing rate.

On the other hand, when the number-average molecular weight of the polyol A is higher than 800 and/or the number-average molecular weight of the polyol B is higher than 1300, the "consistency" of the material of the polishing layer itself becomes so high that dressing waste upon dressing is increased, and the grooves and fine openings are clogged with the dressing waste thereby generating center slow.

The number-average molecular weight of the polyol A is preferably 600 to 800. On one hand, the number-average molecular weight of the polyol B is preferably 1000 to 1200.

In the present invention, the ratio by weight of the polyol A to the polyol B, i.e. A/B, should be from 10/90 to 50/50, preferably from 15/85 to 35/65. When the weight ratio of the polyol A is less than 10, the "consistency" of the material of the polishing layer itself becomes so high that dressing waste upon dressing is increased, and the grooves and fine openings are clogged with the dressing waste thereby generating center slow. On one hand, when the weight ratio of the polyol A is greater than 50, the hardness of the polishing layer becomes so high that the abrasion wear of the surface becomes higher than necessary, thus reducing the longevity of the polishing pad, and the fluffiness of the surface of the polishing layer after dressing is eliminated immediately upon wafer polishing, to reduce the polishing rate.

The polyurethane foam is preferably a cured product produced by reacting, with a chain extender, an isocyanate-terminated prepolymer containing a high-molecular-weight polyol component and an isocyanate component.

The polyurethane foam is preferably a cured product produced by reacting, with a chain extender, an isocyanate-terminated prepolymer A containing the polyol A and an isocyanate component and an isocyanate-terminated prepolymer B containing the polyol B and an isocyanate component. The polyurethane foam obtained by the prepolymer process is preferable because of excellent polishing characteristics.

The polyols A and B used are preferably hydrophobic. The reduction in surface hardness caused by swelling or decomposition upon contacting the surface of the polishing pad with slurry can thereby be suppressed. In the present invention, the polyols A and B are preferably polytetramethylene glycol, from the viewpoint of hydrolysis resistance and excellent mechanical strength.

In the present invention, the chain extender is preferably an aromatic diamine. By using an aromatic diamine as the chain extender, the specific gravity, hardness etc. of the polishing layer can be easily regulated. The aromatic diamine is preferably a non-halogen aromatic diamine in consideration of environment etc.

In the present invention, the polyurethane foam preferably contains a hydroxyl group-free silicon-based nonionic surfactant in an amount of 0.05 wt % to less than 5 wt %, more preferably 0.5 wt % to 4 wt %. When the amount of the silicon-based nonionic surfactant is less than 0.05 wt %, the foam with fine cells tends to be hardly obtained. On the other hand, when the amount is 5 wt % or more, the number of cells in the foam is so high that the polyurethane foam of high hardness tends to be hardly obtained.

The specific gravity of the polyurethane foam is preferably 0.7 to 0.88, more preferably 0.73 to 0.85. When the specific gravity is less than 0.7, the surface hardness of the polishing layer is reduced, the planarity of an object of polishing (wafer) is lowered, and the longevity tends to be worsened. On the other hand, when the specific gravity is greater than 0.88, dressing waste upon dressing is increased, and the grooves and fine openings are clogged with the dressing waste thereby generating center slow.

The Asker D hardness of the polyurethane foam is preferably 45° to 60°, more preferably 50° to 55°. When the Asker D hardness is less than 45°, the planarity of an object of polishing is decreased, while when the Asker D hardness is greater than 60°, the object of polishing is excellent in planarity but tends to be poor in uniformity.

The tensile strength of the polyurethane foam is preferably 15 MPa to 25 MPa, more preferably 20 MPa to 25 MPa. When the tensile strength is less than 15 MPa, the planarizing quality of the polishing pad tends to be lowered, while when the tensile strength is greater than 25 MPa, the surface of an object of polishing tends to be easily scratched.

The tensile elongation at break of the polyurethane foam is preferably 50% to 150%, more preferably 80% to 130%. When the tensile elongation at break is less than 50%, the abrasion wear of the surface of the polishing layer becomes higher than necessary, thus reducing the longevity of the polishing pad, and the fluffiness of the surface of the polishing layer after dressing is eliminated immediately upon wafer polishing, to reduce the polishing rate. On the other hand, when the tensile elongation at break is greater than 150%, the "consistency" of the polyurethane resin becomes so high that polishing waste is increased to cause clogging easily.

The dressing speed of the polishing pad of the present invention is preferably 6 μm/min to 17 μm/min., more preferably 6 μm/min to 10 μm/min., from the viewpoint of longevity, prevention of clogging, etc.

Further, the present invention relates to a method of producing a semiconductor device, which comprises a step of polishing the surface of a semiconductor wafer with the polishing pad described above.

DETAILED DESCRIPTION OF THE INVENTION

Figure 1:
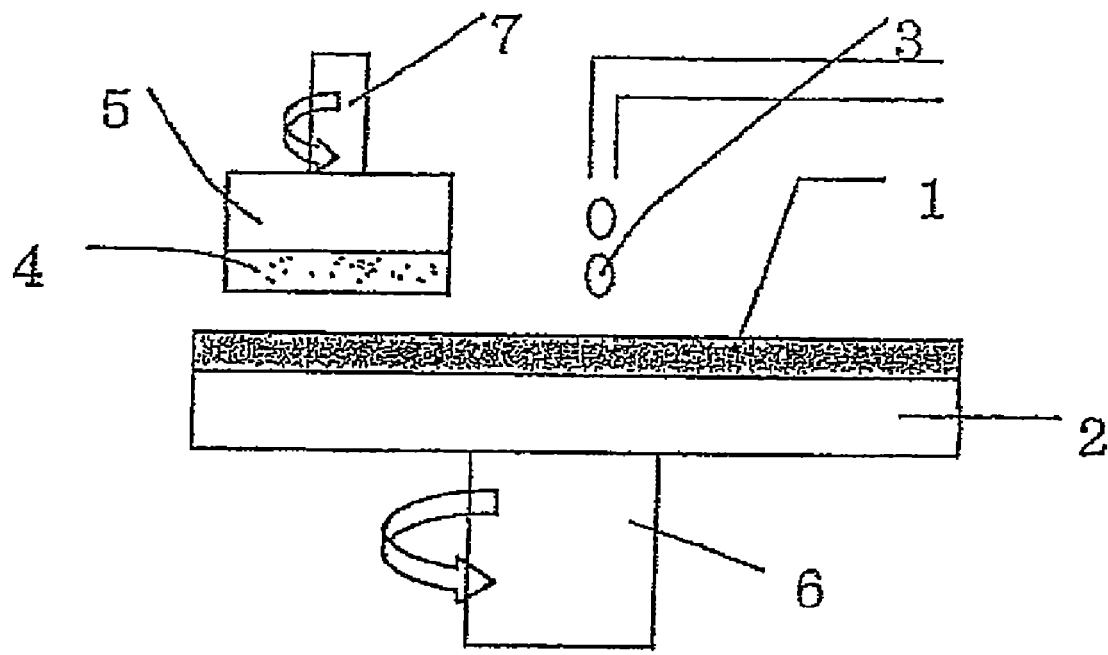
FIG. 1 is a side view of a polishing apparatus using the polishing pad of this invention.

The polishing pad of the present invention has a polishing layer comprising polyurethane foam having fine cells. The polishing pad of the present invention may consist of a polishing layer only or may be a laminate consisting of a polishing layer and another layer (for example, a cushion layer or the like).

The polyurethane foam consists of at least an isocyanate component and a high-molecular-weight polyol component as starting components, wherein the high-molecular-weight polyol component contains a hydrophobic high-molecular-weight polyol A having a number-average molecular weight of 550 to 800 and a hydrophobic high-molecular-weight polyol B having a number-average molecular weight of 950 to 1300.

The polyol A is not particularly limited insofar as it is a polyol having a number-average molecular weight of 550 to 800 not containing hydrophilic groups other than hydroxyl groups reacting with isocyanate groups. The polyol B is not particularly limited insofar as it is a polyol having a number-average molecular weight of 950 to 1300 not containing hydrophilic groups other than hydroxyl groups reacting with isocyanate groups.

The hydrophilic groups other than hydroxyl groups are generally functional groups or salts containing an element such as oxygen, nitrogen or sulfur, and examples include functional groups such as $-NH_2$, $-CONH_2$, $-NHCONH_2$, $-SH$, $-SO_3H$, $-OSO_3H$, $-(CH_2CH_2O)_n-$, and $-COOH$, and salts such as $-SO_3M$ (M, alkali metal), $-OSO_3M$, $-COOM$, $-NR_3X$ (R, alkyl group; X, halogen).

The polyols A and B include, for example, hydroxy-terminated polyester polyol, polycarbonate polyol, polyester polycarbonate polyol, polyether polyol, polyether polycarbonate polyol, polyester amide, phenol resin polyol, epoxy polyol, polybutadiene polyol, and polyisoprene polyol etc.

The polyester polyol includes polypropylene adipate, polybutylene adipate, polyhexamethylene adipate, and polycaprolactone polyol etc.

The polyether polyol includes polyhexamethylene glycol (PHMG), polytetramethylene glycol (PTMG), and polypropylene glycol (PPG) etc.

The polyether polycarbonate polyol includes products produced by reacting diols such as 1,3-propane diol, 1,4-butane diol, 1,6-hexane diol, polypropylene glycol and/or polytetramethylene glycol, with phosgene, diallyl carbonates (for example, diphenyl carbonate), or cyclic carbonates (for example propylene carbonate).

Examples of the polyester polycarbonate polyol include reaction products (e.g. polycaprolactone polyol etc.) of polyester glycols with alkylene carbonates, as well as products produced by reacting an ethylene carbonate with a polyvalent alcohol and then reacting the resulting reaction mixture with an organic dicarboxylic acid.

The polyol A may consist of the above-mentioned polyol alone or may be a combination of two or more thereof. Similarly, the polyol B may consist of the above-mentioned polyol alone or may be a combination of two or more thereof.

The high-molecular-weight polyol component is preferably polyols A and B only, or may contain polyol components other than those described above and usually used as polyol compounds in the technical field of polyurethane. When the polyol components other than those described above are used, the amount thereof is preferably 20 wt % or less, more preferably 10 wt % or less, based on the whole of the high-molecular-weight polyol components.

As the isocyanate component, a compound known in the field of polyurethane can be used without particular limitation. The isocyanate component includes, for example, aromatic diisocyanates such as 2,4-toluene diisocyanate, 2,6-toluene diisocyanate, 2,2'-diphenyl methane diisocyanate, 2,4'-diphenyl methane diisocyanate, 4,4'-diphenyl methane diisocyanate, 1,5-naphthalene diisocyanate, p-phenylene diisocyanate, m-phenylene diisocyanate, p-xylylene diisocyanate and m-xylylene diisocyanate, aliphatic diisocyanates such as ethylene diisocyanate, 2,2,4-trimethyl hexamethylene diisocyanate and 1,6-hexamethylene diisocyanate, and alicyclic diisocyanates such as 1,4-cyclohexane diisocyanate, 4,4'-dicyclohexyl methane diisocyanate, isophorone diisocyanate and norbornane diisocyanate. These may be used alone or as a mixture of two or more thereof.

As the isocyanate component, it is possible to use not only the above-described diisocyanate compounds but also multifunctional (trifunctional or more) polyisocyanates. As the multifunctional isocyanate compounds, a series of diisocyanate adduct compounds are commercially available as Desmodul-N (Bayer) and Duranate™ (Asahi Chemical Industry Co., Ltd.).

Examples of the low-molecular-weight polyol that can be used together with a high-molecular-weight polyol described above include: ethylene glycol, 1,2-propylene glycol, 1,3-propylene glycol, 1,2-butanediol, 1,3-butanediol, 1,4-butanediol, 2,3-butanediol, 1,6-hexanediol, neopentyl glycol, 1,4-cyclohexanedimethanol, 3-methyl-1,5-pentanediol, diethylene glycol, triethyleneglycol, 1,4-bis(2-hydroxyethoxy)benzene, trimethylolpropane, glycerin, 1,2,6-hexanetriol, pentaerythritol, tetramethylolcyclohexane, methyl glucoside, sorbitol, mannitol, dulcitol, sucrose, 2,2,6,6-tetrakis(hydroxymethyl)cyclohexanol, diethanolamine, N-methyldiethanolamine, triethanolamine and the like. Other examples that can be used together with the high-molecular-weight polyol also include: low-molecular-weight polyamine such as ethylenediamine, tolylenediamine, diphenylmethanediamine, diethylenetriamine and the like. The low-molecular-weight polyols and the low-molecular-weight polyamines may be used either alone or in combination of two or more kinds. A mixing quantity of each of a low-molecular-weight polyol and a low-molecular-weight polyamine is not specifically limited and properly determined so as to match characteristics required for a manufactured polishing pad (a polishing layer). A molecular weight of a low-molecular-weight polyol and a low-molecular-weight polyamine is less than 500, preferably 250 or less.

In a case where a polyurethane foam is produced by means of a prepolymer method, a chain extender is used in curing of a prepolymer. A chain extender is an organic compound having at least two active hydrogen groups and examples of the active hydrogen group include: a hydroxyl group, a primary or secondary amino group, a thiol group (SH) and the like. Concrete examples of the chain extender include: polyamines such as 4,4'-methylenebis(o-chloroaniline)(MOCA), 2,6-dichloro-p-phenylenediamine, 4,4'-methylenebis(2,3-dichloroaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethylene glycol-di-p-aminobenzoate, polytetramethylene oxide-di-p-aminobenzoate, 4,4'-diamino-3,3',5,5'-tetraethyldiphenylmethane, 4,4'-diamino-3,3'-diisopropyl-5.5'-dimethyldiphenylmethane, 4,4'-diamino-3,3',5,5'-tetraisopropyldiphenylmethane, 1,2-bis(2-aminophenylthio)ethane, 4,4'-diamino-3,3'-diethyl-5.5'-dimethyldiphenylmethane, N,N'-di-sec-butyl-4,4'-diaminophenylmethane, 3,3'-diethyl-4,4'-diaminodiphenylmethane, m-xylylenediamine, N,N'-di-sec-butyl-p-phenylenediamine, m-phenylenediamine and p-xylylenediamine; low-molecular-weight polyol component; and a low-molecular-weight polyamine component. The chain extenders described above may be used either alone or in mixture of two kinds or more. Especially preferably used are halogen free aromatic diamines such as 3,5-bis(methylthio)-2,4-toluenediamine and 3,5-bis(methylthio)-2,6-toluenediamine.

A ratio between an isocyanate component, a polyol component and a chain extender in the invention can be altered in various ways according to molecular weights thereof, desired physical properties of a polishing pad and the like. In order to obtain a polishing pad with desired polishing characteristics, a ratio of the number of isocyanate groups in an isocyanate component relative to a total number of active hydrogen groups (hydroxyl groups+amino groups) in a polyol component and a chain extender is preferably in the range of from 0.80 to 1.20 and more preferably in the range of from 0.99 to 1.15. If the number of isocyanate groups falls outside the range, a tendency arises that insufficient curing occurs, thereby neither a specific gravity nor a hardness, both are desired, is obtained and polishing characteristics are deteriorated.

A polyurethane foam can be produced by applying a melting method, a solution method or a known urethanization technique, among which preferable is a melting method, consideration being given to a cost, a working environment and the like.

Manufacture of a polyurethane foam is enabled by means of either a prepolymer method or a one shot method, of which preferable is a prepolymer method in which an isocyanate-terminated prepolymer is synthesized from an isocyanate component and a polyol component in advance, with which a chain extender is reacted since physical properties of an obtained polyurethane resin is excellent.

Note that an isocyanate-terminated prepolymer with a molecular weight of the order in the range of from 800 to 5000 is preferable because of excellency in workability and physical properties.

Manufacture of the polyurethane foam is to mix the first component containing an isocyanate group containing compound and the second component containing an active hydrogen group containing compound to thereby cure the reaction product. In the prepolymer method, an isocyanate-terminated prepolymer serves as an isocyanate group containing compound and a chain extender serves as an active hydrogen group containing compound. In the one shot method, an isocyanate component serves as an isocyanate group containing compound, and a chain extender and a polyol component combined serves as an active hydrogen containing compound.

Manufacturing methods of a polyurethane foam include: a method in which hollow beads are added, a mechanically foaming method, a chemically forming method and the like.

The mechanically foaming method using an active hydrogen group-free silicone-based surfactant consisting of a polyalkyl siloxane/polyether copolymer is preferable. As the silicone-based surfactant, L5340 (Nippon Unicar Co., Ltd.) and SH-192 (Toray Dow Corning Silicone Co., Ltd.) can be mentioned as a preferable compound.

Various additives may be mixed; such as a stabilizer including an antioxidant, a lubricant, a pigment, a filler, an antistatic agent and others.

Description will be given of an example of a method of producing a polyurethane foam of a fine cell type constituting a polishing pad (a polishing layer) below. A method of manufacturing such a polyurethane foam has the following steps:

1) a foaming step of preparing a cell dispersion liquid of an isocyanate-terminated prepolymer (a first component),
wherein a silicone-based surfactant is added into an isocyanate-terminated prepolymer, which is agitated in the presence of a non-reactive gas to thereby disperse the non-reactive gas into the prepolymer as fine cells and obtain a cell dispersion liquid. In a case where the prepolymer is solid at an ordinary temperature, the prepolymer is preheated to a proper temperature and used in a molten state.

2) a curing agent (chain extender) mixing step,
wherein a chain extender (a second component) is added into the cell dispersion liquid, which is agitated to thereby obtain a foaming reaction liquid.

3) a casting step,
wherein the forming reaction liquid is cast into a mold.

4) a curing step,
wherein the foaming reaction liquid having been cast into the mold is heated and reaction-cured.

The non-reactive gas used for forming fine cells is preferably not combustible, and is specifically nitrogen, oxygen, a carbon dioxide gas, a rare gas such as helium and argon, and a mixed gas thereof, and the air dried to remove water is most preferable in respect of cost.

As a stirrer for dispersing the silicone-based surfactant-containing first component to form fine cells with the non-reactive gas, known stirrers can be used without particular limitation, and examples thereof include a homogenizer, a dissolver, a twin-screw planetary mixer etc. The shape of a stirring blade of the stirrer is not particularly limited either, but a whipper-type stirring blade is preferably used to form fine cells.

In a preferable mode, different stirrers are used in stirring for forming a cell dispersion liquid in the stirring step and in stirring for mixing an added chain extender in the mixing step, respectively. In particular, stirring in the mixing step may not be stirring for forming cells, and a stirrer not generating large cells is preferably used. Such a stirrer is preferably a planetary mixer. The same stirrer may be used in the stirring step and the mixing step, and stirring conditions such as revolution rate of the stirring blade are preferably regulated as necessary.

In the method of producing the polyurethane foam with fine cells, heating and post-curing of the foam obtained after casting and reacting the forming reaction liquid in a mold until the dispersion lost fluidity are effective in improving the physical properties of the foam, and are extremely preferable. The forming reaction liquid may be cast in a mold and immediately post-cured in a heating oven, and even under such conditions, heat is not immediately conducted to the reactive components, and thus the diameters of cells are not increased. The curing reaction is conducted preferably at normal pressures to stabilize the shape of cells.

In the production of the polyurethane foam, a known catalyst promoting polyurethane reaction, such as tertiary amine-based catalysts, may be used. The type and amount of the catalyst added are determined in consideration of flow time in casting in a predetermined mold after the mixing step.

Production of the polyurethane foam may be in a batch system where each component is weighed out, introduced into a vessel and mixed or in a continuous production system where each component and a non-reactive gas are continuously supplied to, and stirred in, a stirring apparatus and the resulting forming reaction liquid is transferred to produce molded articles.

A manufacturing method of a polishing pad of the invention may be performed in ways: in one of which a prepolymer which is a raw material from which a polyurethane foam is made is put into a reaction vessel, thereafter a chain extender is mixed into the prepolymer, the mixture is agitated, thereafter the mixture is cast into a mold with a predetermined size to thereby prepare a block and the block is sliced with a slicer like a planer or a band saw; and in another of which in the step of casting into the mold, a thin sheet may be directly produced. Besides, a still another way may be adopted in which a resin of raw material is melted, the melt is extruded through a T die to thereby mold a polyurethane foam directly in the shape of a sheet.

In the invention, an average cell diameter of a polyurethane foam is preferably 70 µm or less and more preferably in the range of from 30 to 60 µm. If an average cell diameter exceeds 70 µm, a tendency arises that a planarity of an object to be polished after polishing is reduced.

A polishing pad (polishing layer) of the invention is preferably provided with a depression and a protrusion structure for holding and renewing a slurry. Though in a case where the polishing layer is formed with a fine foam, many openings are on a polishing surface thereof which works so as to hold the slurry, a depression and protrusion structure are preferably provided on the surface of the polishing side thereof in order to achieve more of holdability and renewal of the slurry or in order to prevent induction of dechuck error, breakage of a wafer or decrease in polishing efficiency. The shape of the depression and protrusion structure is not particularly limited insofar as slurry can be retained and renewed, and examples include latticed grooves, concentric circle-shaped grooves, through-holes, non-through-holes, polygonal prism, cylinder, spiral grooves, eccentric grooves, radial grooves, and a combination of these grooves. The groove pitch, groove width, groove thickness etc. are not particularly limited either, and are suitably determined to form grooves. These depression and protrusion structure are generally those having regularity, but the groove pitch, groove width, groove depth etc. can also be changed at each certain region to make retention and renewal of slurry desirable.

The method of forming the depression and protrusion structure is not particularly limited, and for example, formation by mechanical cutting with a jig such as a bite of predetermined size, formation by casting and curing resin in a mold having a specific surface shape, formation by pressing resin with a pressing plate having a specific surface shape, formation by photolithography, formation by a printing means, and formation by a laser light using a $CO_2$ gas laser or the like.

The scatter of the thickness of the polishing layer is preferably 100 µm or less. When the scatter of the thickness is higher than 100 µm, large undulation is caused to generate portions different in a contacting state with an object of polishing, thus adversely influencing polishing characteristics. To solve the scatter of the thickness of the polishing layer, the surface of the polishing layer is dressed generally in an initial stage of polishing by a dresser having abrasive grains of diamond deposited or fused thereon, but the polishing layer outside of the range described above requires a longer dressing time to reduce the efficiency of production.

As a method of suppressing the scatter of thickness, there is also a method of buffing the surface of the polishing layer having a predetermined thickness. Buffing is conducted preferably stepwise by using polishing sheets different in grain size.

A polishing pad of the invention may also be a laminate of a polishing layer and a cushion sheet adhered to each other.

The cushion sheet (cushion layer) compensates for characteristics of the polishing layer. The cushion layer is required for satisfying both planarity and uniformity which are in a tradeoff relationship in CMP. Planarity refers to flatness of a pattern region upon polishing an object of polishing having fine unevenness generated upon pattern formation, and uniformity refers to the uniformity of the whole of an object of polishing. Planarity is improved by the characteristics of the polishing layer, while uniformity is improved by the characteristics of the cushion layer. The cushion layer used in the polishing pad of the present invention is preferably softer than the polishing layer.

The material forming the cushion layer is not particularly limited, and examples of such material include a nonwoven fabric such as a polyester nonwoven fabric, a nylon nonwoven fabric or an acrylic nonwoven fabric, a nonwoven fabric impregnated with resin such as a polyester nonwoven fabric impregnated with polyurethane, polymer resin foam such as polyurethane foam and polyethylene foam, rubber resin such as butadiene rubber and isoprene rubber, and photosensitive resin.

Means for adhering the polishing layer to the cushion layer include: for example, a method in which a double sided tape is sandwiched between the polishing layer and the cushion layer, followed by pressing.

The double sided tape is of a common construction in which adhesive layers are provided on both surfaces of a substrate such as a nonwoven fabric or a film. It is preferable to use a film as a substrate with consideration given to prevention of permeation of a slurry into a cushion sheet. A composition of an adhesive layer is, for example, of a rubber-based adhesive, an acrylic-based adhesive or the like. An acrylic-based adhesive is preferable because of less of a content of metal ions, to which consideration is given. Since a polishing layer and a cushion sheet is sometimes different in composition from each other, different compositions are adopted in respective adhesive layers of double sided tape to thereby also enable adhesive forces of the respective adhesive layers to be adjusted to proper values.

A polishing pad of the invention may be provided with a double sided tape on the surface of the pad adhered to a platen. As the double sided tape, a tape of a common construction can be used in which adhesive layers are, as described above, provided on both surfaces of a substrate. As the substrate, for example, a nonwoven fabric or a film is used. Preferably used is a film as a substrate since separation from the platen is necessary after the use of a polishing pad. As a composition of an adhesive layer, for example, a rubber-based adhesive or an acrylic-based adhesive is exemplified. Preferable is an acrylic-based adhesive because of less of metal ions in content to which consideration is given.

A semiconductor device is fabricated after operation in a step of polishing a surface of a semiconductor wafer with a polishing pad. The term, a semiconductor wafer, generally means a silicon wafer on which a wiring metal and an oxide layer are stacked. No specific limitation is imposed on a polishing method of a semiconductor wafer or a polishing apparatus, and polishing is performed with a polishing apparatus equipped, as shown in FIG. 1, with a polishing platen 2 supporting a polishing pad (a polishing layer) 1, a polishing head 5 holding a semiconductor wafer 4, a backing material for applying a uniform pressure against the wafer and a supply mechanism of a polishing agent 3. The polishing pad 1 is mounted on the polishing platen 2 by adhering the pad to the platen with a double sided tape. The polishing platen 2 and the polishing head 5 are disposed so that the polishing pad 1 and the semiconductor wafer 4 supported or held by them oppositely face each other and provided with respective rotary shafts 6 and 7. A pressure mechanism for pressing the semiconductor wafer 4 to the polishing pad 1 is installed on the polishing head 5 side. During polishing, the semiconductor wafer 4 is polished by being pressed against the polishing pad 1 while the polishing platen 2 and the polishing head 5 are rotated and a slurry is fed. No specific limitation is placed on a flow rate of the slurry, a polishing load, a polishing platen rotation number and a wafer rotation number, which are properly adjusted.

Protrusions on the surface of the semiconductor wafer 4 are thereby removed and polished flatly. Thereafter, a semiconductor device is produced therefrom through dicing, bonding, packaging etc. The semiconductor device is used in an arithmetic processor, a memory etc.

EXAMPLES

Description will be given of the invention with examples, while the invention is not limited to description in the examples.
[Measurement and Evaluation Method]
(Measurement of Number-Average Molecular Weight)

A number-average molecular weight was measured by GPC (a Gel Permeation Chromatography) and a value as measured was converted in terms of standard polystyrene molecular weight, and the apparatus and conditions in operation were as follows:

GPC apparatus was an apparatus manufactured by Shimadzu Corp., with Model Number of LC-10A.

Columns that were used in measurement were ones manufactured by Polymer Laboratories Co., in which three columns were in connection including (PL gel, 5 μm and 500 Å), (PL gel, 5 μm and 100 Å) and (PL gel, 5 μm and 50 Å).

A flow rate was 1.0 ml/min.
A concentration was 1.0 g/l.
An injection quantity was 40 μl.
A column temperature was 40° C.
An eluent was tetrahydrofuran.

(Measurement of Specific Gravity)

Determined according to JIS Z8807-1976. A manufactured polyurethane foam cut out in the form of a strip of 4 cm×8.5 cm (thickness: arbitrary) was used as a sample for measurement of specific gravity and left for 16 hours in an environment of a temperature of 23±2° C. and a humidity of 50%±5%. Measurement was conducted by using a specific gravity hydrometer (manufactured by Sartorius Co., Ltd).
(Measurement of Hardness)

Measurement is conducted according to JIS K6253-1997. A manufactured polyurethane foam cut out in a size of 2 cm×2 cm (thickness: arbitrary) was used as a sample for measurement of hardness and left for 16 hours in an environment of a temperature of 23±2° C. and a humidity of 50%±5%. At the time of measurement, samples were stuck on one another to a thickness of 6 mm or more. A hardness meter (Asker D hardness meter, manufactured by Kobunshi Keiki Co., Ltd.) was used to measure hardness.
(Measurement of Tensile Breaking Extension and Tensile Strength)

According to JIS K7312-1996, a prepared polyethylene resin foam was punched into a shape of dumbbell No. 3 to obtain a sample. The sample was aged for 24 hours under condition of 22° C. and 66% RH and, thereafter, a tensile test was performed. A tensile breaking extension and a tensile strength were measured. As a tensile tester, Instron Universal Testing Machine (Model 4300, manufactured by Instron) was used and, as a software, a video extension meter controlled by series IX was used.
(Measurement of Dressing Speed)

A surface of a manufactured polishing pad was uniformly dressed with a diamond dresser (manufactured by Asahi Diamond Co. with a trade name of M Type #100 in the shape of a circle with a diameter of 20 cm) while being rotated. A dresser load at this time was set to 450 g/cm², a polishing platen rotation number was set to 30 rpm, a dresser rotation number was set to 15 rpm and a dressing time was set to 100 min. A dressing speed was calculated from thickness values of the polishing pad as measured before and after dressing.
(Evaluation of Polishing Characteristics)

Using SPP600S (manufactured by Okamoto Machine Tool Works, Ltd.) as a polishing device, the prepared polishing pad was evaluated for its polishing characteristics. An about 1 μm thermal-oxide film deposited on an 8-inch silicone wafer was polished by about 0.5 μm with the polishing pad, and the polishing rate was calculated from the time of this polishing. The polishing rates on the $10^{th}$, $50^{th}$, $100^{th}$, $300^{th}$ and $500^{th}$ wafers are shown in Table 2. The thickness of an oxide film was measured by an interference film thickness measuring device manufactured by Otsuka Electronics Co., Ltd. During polishing, silica slurry (SS12 manufactured by Cabot) was added at a flow rate of 150 ml/min. Polishing loading was 350 g/cm², the number of revolutions of the polishing platen was 35 rpm, and the number of revolutions of the wafer was 30 rpm.

Figure 2:
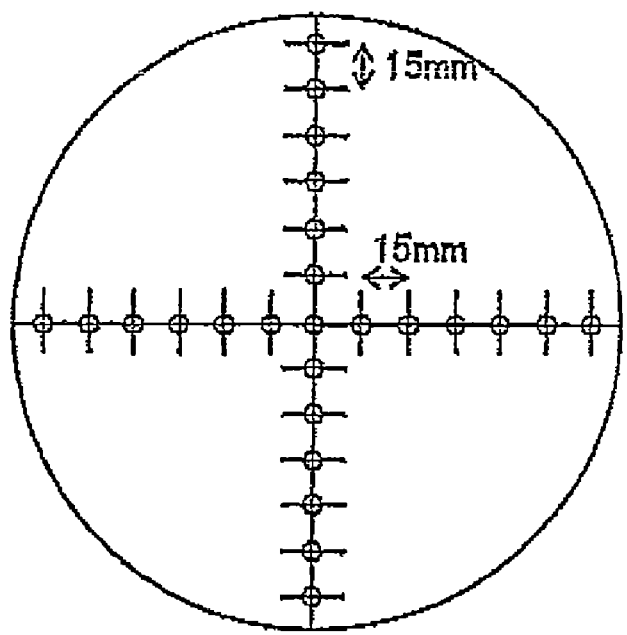
FIG. 2 is a plot of polishing rate values using the polishing pad of this invention.

The center slow was evaluated by measuring uniformity. An about 1 μm thermal-oxide film deposited on an 8-inch silicone wafer was polished for 2 minutes under the polishing conditions described above, and as shown in FIG. 2, the polishing rate maximum value and the polishing rate minimum value were determined by measuring film thickness at specified 25 positions on the wafer before and after polishing, and from these values, uniformity was calculated according to the following equation. The uniformity on the $10^{th}$, $50^{th}$, $100^{th}$, $300^{th}$ and $500^{th}$ wafers are shown in Table 2. Lower uniformity is indicative of higher uniformity of wafer surface.

Uniformity(%)={(polishing rate maximum value−polishing rate minimum value)/(polishing rate maximum value+polishing rate minimum value)}×100

Example 1

350 parts by weight of polytetramethylene glycol (PTMG with a number-average molecular weight of 650, manufactured by Mitsubishi Chemical Corporation) and 57 parts by weight of diethylene glycol (DEG, manufactured by Mitsubishi Chemical Corporation) were introduced into a separable flask, and dehydrated under stirring under reduced pressure for 2 hours. By introducing nitrogen into the separable flask, the atmosphere therein was replaced by nitrogen, and 300 parts by weight of toluene diisocyanate (a mixture of 2,4-diisocyanate/2,6-diisocyanate in a ratio of 80/20 manufactured by Mitsui Takeda Chemicals, Inc.; hereinafter referred to as TDI-80) and 114 parts by weight of 4,4'-dicyclohexyl methane diisocyanate (hereinafter abbreviated as HMDI) were added thereto. While the temperature of the reaction system was kept at about 70° C., the reaction mixture was stirred until the reaction was finished. The reaction was regarded to be finished when NCO % became almost constant (NCO %=11.0). Thereafter, the reaction solution was defoamed under reduced pressure for two hours to give an isocyanate-terminated prepolymer (A).

650 parts by weight of polytetramethylene glycol (PTMG with a number-average molecular weight of 1000, manufactured by Mitsubishi Chemical Corporation) and 69 parts by weight of diethylene glycol (DEG, manufactured by Mitsubishi Chemical Corporation) were introduced into a separable flask, and dehydrated under stirring under reduced pressure for 2 hours. By introducing nitrogen into the separable flask, the atmosphere therein was replaced by nitrogen, and 362 parts by weight of TDI-80 and 137 parts by weight of HMDI were added thereto. While the temperature of the reaction system was kept at about 70° C., the reaction mixture was stirred until the reaction was finished. The reaction was regarded to be finished when NCO % became almost constant (NCO %=8.9). Thereafter, the reaction solution was defoamed under reduced pressure for two hours to give an isocyanate-terminated prepolymer (B).

50 parts by weight of the isocyanate-terminated prepolymer (A), 50 parts by weight of the isocyanate-terminated prepolymer (B), and 5 parts (3.74 wt % in polyurethane resin) by weight of a silicon-based surfactant L5340 (manufactured by Nippon Unicar Co., Ltd.) were introduced into a container, and regulated at 60° C. 28.7 parts by weight of 4,4'-methylene-bis(o-chloroaniline) (abbreviated hereinafter as MOCA) previously melted at 120° C. were added to the mixture under vigorous stirring to incorporate bubbles into the reaction system. The mixture was stirred for about 1 minute, and the mixed solution was introduced into a pan-type open mold and post-cured for 16 hours in an oven at 100° C., to produce a polyurethane foam block. PTMG650/PTMG1000 was 35/65 (weight ratio).

A foam sheet was cut off from this polyurethane foam block by a slicer and then provided with grooves in the form of concentric circles to prepare a polishing layer, and a polishing pad was prepared by laminating its reverse side with a cushion material (cushion layer) comprising a commercial nonwoven fabric impregnated with polyurethane.

Example 2

1113 parts by weight of polytetramethylene glycol (PTMG with a number-average molecular weight of 1000, manufactured by Mitsubishi Chemical Corporation), 196 parts by weight of polytetramethylene glycol (PTMG with a number-average molecular weight of 650, manufactured by Mitsubishi Chemical Corporation) and 150 parts by weight of diethylene glycol (DEG, manufactured by Mitsubishi Chemical Corporation) were introduced into a separable flask, and dehydrated under stirring under reduced pressure for 2 hours. By introducing nitrogen into the separable flask, the atmosphere therein was replaced by nitrogen, and 900 parts by weight of TDI-80 and 151 parts by weight of HMDI were added thereto. While the temperature of the reaction system was kept at about 70° C., the reaction mixture was stirred until the reaction was finished. The reaction was regarded to be finished when NCO % became almost constant (NCO %=9.1). Thereafter, the reaction solution was defoamed under reduced pressure for two hours to give an isocyanate-terminated prepolymer (C). PTMG650/PTMG1000 was 15/85 (weight ratio).

100 parts by weight of the isocyanate-terminated prepolymer (C) and 5 parts (3.74 wt % in polyurethane resin) by weight of a silicon-based surfactant L5340 (manufactured by Nippon Unicar Co., Ltd.) were introduced into a container, and regulated at 60° C. 28.7 parts by weight of MOCA previously melted at 120° C. were added to the mixture under vigorous stirring to incorporate bubbles into the reaction system. The mixture was stirred for about 1 minute, and the mixed solution was introduced into a pan-type open mold and post-cured for 16 hours in an oven at 100° C., to produce a polyurethane foam block. Thereafter, a polishing pad was prepared in the same manner as in Example 1.

Example 3

A polishing pad was prepared in the same manner as in Example 1 except that 25.2 parts by weight of ETACURE 300 (a mixture of 3,5-bis(methylthio)-2,6-toluene diamine and 3,5-bis(methylthio)-2,4-toluene diamine), manufactured by Albemarle Corporation) were used in place of 28.7 parts by weight of MOCA.

Comparative Example 1

1415 parts by weight of polytetramethylene glycol (PTMG with a number-average molecular weight of 1000, manufactured by Mitsubishi Chemical Corporation) and 150 parts by weight of diethylene glycol (DEG, manufactured by Mitsubishi Chemical Corporation) were introduced into a separable flask, and dehydrated under stirring under reduced pressure for 2 hours. By introducing nitrogen into the separable flask, the atmosphere therein was replaced by nitrogen, and 890 parts by weight of TDI-80 and 150 parts by weight of HMDI were added thereto. While the temperature of the reaction system was kept at about 70° C., the reaction mixture was stirred until the reaction was finished. The reaction was regarded to be finished when NCO % became almost constant (NCO %=9.2). Thereafter, the reaction solution was defoamed under reduced pressure for two hours to give an isocyanate-terminated prepolymer (D).

100 parts by weight of the isocyanate-terminated prepolymer (D) and 3 parts (2.32 wt % in polyurethane resin) by weight of a silicon-based surfactant L5340 were introduced into a container, and regulated at 60° C. 26.2 parts by weight of MOCA previously melted at 120° C. were added to the mixture under vigorous stirring to incorporate bubbles into the reaction system. The mixture was stirred for about 1 minute, and the mixed solution was introduced into a pan-type open mold and post-cured for 16 hours in an oven at 100° C., to produce a polyurethane foam block. Thereafter, a polishing pad was prepared in the same manner as in Example 1.

Comparative Example 2

308 parts by weight of polytetramethylene glycol (PTMG with a number-average molecular weight of 1000, manufactured by Mitsubishi Chemical Corporation), 719 parts by weight of polytetramethylene glycol (PTMG with a number-average molecular weight of 650, manufactured by Mitsubishi Chemical Corporation) and 150 parts by weight of diethylene glycol (DEG, manufactured by Mitsubishi Chemical Corporation) were introduced into a separable flask, and dehydrated under stirring under reduced pressure for 2 hours. By introducing nitrogen into the separable flask, the atmosphere therein was replaced by nitrogen, and 840 parts by weight of TDI-80 and 141 parts by weight of HMDI were added thereto. While the temperature of the reaction system was kept at about 70° C., the reaction mixture was stirred until the reaction was finished. The reaction was regarded to be finished when NCO % became almost constant (NCO %=9.1). Thereafter, the reaction solution was defoamed under reduced pressure for two hours to give an isocyanate-terminated prepolymer (E). PTMG650/PTMG1000 was 70/30 (weight ratio) 100 parts by weight of the isocyanate-terminated prepolymer (E) and 10 parts (7.4 wt % in polyurethane resin) by weight of a silicon-based surfactant L5340 were introduced into a container, and regulated at 60° C. 25.8 parts by weight of MOCA previously melted at 120° C. were added to the mixture under vigorous stirring to incorporate bubbles into the reaction system. The mixture was stirred for about 1 minute, and the mixed solution was introduced into a pan-type open mold and post-cured for 16 hours in an oven at 100° C., to produce a polyurethane foam block. Thereafter, a polishing pad was prepared in the same manner as in Example 1.

Comparative Example 3

1309 parts by weight of polytetramethylene glycol (PTMG with a number-average molecular weight of 1000, manufactured by Mitsubishi Chemical Corporation), 70 parts by weight of polytetramethylene glycol (PTMG with a number-average molecular weight of 650, manufactured by Mitsubishi Chemical Corporation) and 150 parts by weight of diethylene glycol (DEG, manufactured by Mitsubishi Chemical Corporation) were introduced into a separable flask, and dehydrated under stirring under reduced pressure for 2 hours. By introducing nitrogen into the separable flask, the atmosphere therein was replaced by nitrogen, and 880 parts by weight of TDI-80 and 148 parts by weight of HMDI were added thereto. While the temperature of the reaction system was kept at about 70° C., the reaction mixture was stirred until the reaction was finished. The reaction was regarded to be finished when NCO % became almost constant (NCO %=9.2). Thereafter, the reaction solution was defoamed under reduced pressure for two hours to give an isocyanate-terminated prepolymer (F). PTMG650/PTMG1000 was 5/95 (weight ratio).

100 parts by weight of the isocyanate-terminated prepolymer (F) and 4 parts (3.1 wt % in polyurethane resin) by weight of a silicon-based surfactant L5340 were introduced into a container, and regulated at 60° C. 26.2 parts by weight of MOCA previously melted at 120° C. were added to the mixture under vigorous stirring to incorporate bubbles into the reaction system. The mixture was stirred for about 1 minute, and the mixed solution was introduced into a pan-type open mold and post-cured for 16 hours in an oven at 100° C., to produce a polyurethane foam block. Thereafter, a polishing pad was prepared in the same manner as in Example 1.

Comparative Example 4

1132 parts by weight of polytetramethylene glycol (PTMG with a number-average molecular weight of 800, manufactured by Mitsubishi Chemical Corporation) and 150 parts by weight of diethylene glycol (DEG, manufactured by Mitsubishi Chemical Corporation) were introduced into a separable flask, and dehydrated under stirring under reduced pressure for 2 hours. By introducing nitrogen into the separable flask, the atmosphere therein was replaced by nitrogen, and 820 parts by weight of TDI-80 and 138 parts by weight of HMDI were added thereto. While the temperature of the reaction system was kept at about 70° C., the reaction mixture was stirred until the reaction was finished. The reaction was regarded to be finished when NCO % became almost constant (NCO %=9.1). Thereafter, the reaction solution was defoamed under reduced pressure for two hours to give an isocyanate-terminated prepolymer (G).

100 parts by weight of the isocyanate-terminated prepolymer (G) and 6 parts (4.6 wt % in polyurethane resin) by weight of a silicon-based surfactant L5340 were introduced into a container, and regulated at 60° C. 25.5 parts by weight of MOCA previously melted at 120° C. were added to the mixture under vigorous stirring to incorporate bubbles into the reaction system. The mixture was stirred for about 1 minute, and the mixed solution was introduced into a pan-type open mold and post-cured for 16 hours in an oven at 100° C., to produce a polyurethane foam block. Thereafter, a polishing pad was prepared in the same manner as in Example 1.

|  | Specific gravity | Asker D hardness (degrees) | Tensile strength (MPa) | Tensile elongation at break (%) | Dressing speed (µm/min) |
| --- | --- | --- | --- | --- | --- |
| Example 1 | 0.73 | 53 | 21.2 | 83 | 9.3 |
| Example 2 | 0.80 | 55 | 22.3 | 110 | 7.6 |
| Example 3 | 0.81 | 50 | 19.0 | 123 | 8.2 |
| Comparative Example 1 | 0.87 | 54 | 18.5 | 152 | 4.4 |
| Comparative Example 2 | 0.74 | 54 | 22.3 | 41 | 20.8 |
| Comparative Example 3 | 0.82 | 53 | 19.7 | 140 | 4.8 |
| Comparative Example 4 | 0.70 | 55 | 23.8 | 45 | 22.5 |

TABLE 2

| | 10th wafer | | 50th wafer | | 100th wafer | | 300th wafer | | 500th wafer | |
| --- | --- | --- | --- | --- | --- | --- | --- | --- | --- | --- |
| Number of treated wafers | Polishing rate (Å/min) | Uniformity (%) | Polishing rate (Å/min) | Uniformity (%) | Polishing rate (Å/min) | Uniformity (%) | Polishing rate (Å/min) | Uniformity (%) | Polishing rate (Å/min) | Uniformity (%) |
| Example 1 | 2450 | 5.6 | 2420 | 5.9 | 2370 | 6.4 | 2300 | 7.9 | 2280 | 8.8 |
| Example 2 | 2400 | 6.5 | 2360 | 6.0 | 2330 | 7.1 | 2240 | 8.1 | 2250 | 8.5 |
| Example 3 | 2370 | 6.0 | 2330 | 6.0 | 2270 | 6.8 | 2200 | 7.5 | 2140 | 8.3 |

TABLE 2-continued

| Number of treated wafers | 10th wafer | | 50th wafer | | 100th wafer | | 300th wafer | | 500th wafer | |
|---|---|---|---|---|---|---|---|---|---|---|
| | Polishing rate (Å/min) | Uniformity (%) | Polishing rate (Å/min) | Uniformity (%) | Polishing rate (Å/min) | Uniformity (%) | Polishing rate (Å/min) | Uniformity (%) | Polishing rate (Å/min) | Uniformity (%) |
| Comparative Example 1 | 2300 | 6.3 | 2270 | 6.4 | 2220 | 7.8 | 2090 | 12.5 | 1970 | 17.7 |
| Comparative Example 2 | 2360 | 5.5 | 2340 | 6.4 | 2300 | 7.2 | 2240 | 9.1 | 1680 | 19.9 |
| Comparative Example 3 | 2400 | 5.3 | 2370 | 5.9 | 2350 | 8.4 | 2230 | 10.1 | 2050 | 15.3 |
| Comparative Example 4 | 2370 | 6.5 | 2290 | 6.6 | 2240 | 8.6 | 2100 | 14.5 | 1500 | 24.9 |

From the results in Table 2, the polishing pad of the present invention can effectively eliminate clogging by dressing and can thus prevent generation of center flow. Further, the abrasion wear of the surface of the polishing layer is suitable, and thus the longevity of the polishing pad is good and the polishing rate is not decreased. The polishing pad in Comparative Example 1, on the other hand, is hardly dressed so clogging cannot be completely eliminated. As a result, center slow is generated, and the polishing rate is gradually decreased. The polishing pad in Comparative Example 2 is easily dressed, and when the 500th wafer is polished, the depth of the grooves is insufficient thus generating center slow or significantly decreasing the polishing rate. The polishing pad in Comparative Example 3 is hardly dressed, so clogging cannot be sufficiently eliminated. As a result, center slow is generated, and the polishing rate is gradually decreased. The polishing pad in Comparative Example 4 is very easily dressed, and thus when the 300th wafer is polished, the depth of the grooves is insufficient, and thereafter, center slow is generated significantly and the polishing rate is significantly reduced.

The invention claimed is:

1. A polishing pad having a polishing layer consisting of a polyurethane foam having cells with an average cell diameter of 70 μm or less, wherein a high-molecular-weight polyol component that is a starting component of the polyurethane foam contains a hydrophobic high-molecular-weight polyol A having a number-average molecular weight of 550 to 800 and a hydrophobic high-molecular-weight polyol B having a number-average molecular weight of 950 to 1300 in an A/B ratio of from 10/90 to 50/50 by weight, the polyurethane foam of the polishing layer being a cured product produced by reacting, with a chain extender, an isocyanate-terminated prepolymer A containing the polyol A and an isocyanate component, and an isocyanate-terminated prepolymer B containing the polyol B and an isocyanate component.

2. The polishing pad according to claim 1, wherein the polyurethane foam is a cured product produced by reacting, with a chain extender, an isocyanate-terminated prepolymer containing a polyol component and an isocyanate component.

3. The polishing pad according to claim 1, wherein the hydrophobic high-molecular-weight polyols A and B are polytetramethylene glycol.

4. The polishing pad according to claim 2, wherein the chain extender is an aromatic diamine.

5. The polishing pad according to claim 4, wherein the aromatic diamine is a non-halogen aromatic diamine.

6. The polishing pad according to claim 1, wherein the polyurethane foam contains 0.05 wt % to less than 5 wt % hydroxyl group-free silicon-based nonionic surfactant.

7. The polishing pad according to claim 1, wherein the specific gravity of the polyurethane foam is 0.7 to 0.88.

8. The polishing pad according to claim 1, wherein the Asker D hardness of the polyurethane foam is 45° to 60°.

9. The polishing pad according to claim 1, wherein the tensile strength of the polyurethane foam is 15 MPa to 25 MPa.

10. The polishing pad according to claim 1, wherein the tensile elongation at break of the polyurethane foam is 50% to 150%.

11. A method of producing a semiconductor device, which comprises a step of polishing the surface of a semiconductor wafer with the polishing pad according to claim 1.

* * * * *